United States Patent [19]
Sonobe

[11] Patent Number: 6,167,519
[45] Date of Patent: *Dec. 26, 2000

[54] SECRET INFORMATION PROTECTION SYSTEM

[75] Inventor: Masayuki Sonobe, Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/447,881

[22] Filed: May 23, 1995

Related U.S. Application Data

[62] Division of application No. 07/980,706, Nov. 24, 1992, Pat. No. 5,572,696.

[30] Foreign Application Priority Data

Nov. 27, 1991 [JP] Japan .................................... 3-312233

[51] Int. Cl.⁷ .................................................. G06F 11/30
[52] U.S. Cl. ........................................... 713/200; 711/164
[58] Field of Search ............................... 395/186, 187.01, 395/188.01, 726, 490, 491, 479, 750, 180, 182.01, 835, 837; 380/3, 4, 23, 25; 364/246.6, 969.4; 365/229; 235/492, 436; 211/163, 164; 709/229; 707/9

[56] References Cited

U.S. PATENT DOCUMENTS

| | | | |
|---|---|---|---|
| 4,313,176 | 1/1982 | Cecil | 364/900 |
| 4,484,306 | 11/1984 | Kulczyckyj et al. | 395/188.01 |
| 4,494,114 | 1/1985 | Kaish | 340/825.31 |
| 4,523,271 | 6/1985 | Levien | 395/186 |
| 4,587,640 | 5/1986 | Saitoh | 365/229 |
| 4,593,384 | 6/1986 | Kleijne . | |
| 4,652,990 | 3/1987 | Pailen et al. | 364/200 |
| 4,733,345 | 3/1988 | Anderson | 380/25 |
| 4,777,626 | 10/1988 | Matsushita et al. | 365/226 |
| 4,783,801 | 11/1988 | Kaule . | |
| 5,115,508 | 5/1992 | Hatta | 395/725 |
| 5,131,091 | 7/1992 | Mizuta | 395/725 |
| 5,144,659 | 9/1992 | Jones . | |
| 5,153,917 | 10/1992 | Kato | 380/3 |
| 5,163,147 | 11/1992 | Orita | 395/600 |
| 5,173,876 | 12/1992 | Kawashima et al. | 365/189.07 |
| 5,175,840 | 12/1992 | Sawase et al. . | |
| 5,193,177 | 3/1993 | Burri | 395/183.19 |
| 5,228,084 | 7/1993 | Johnson et al. . | |
| 5,230,074 | 7/1993 | Canova, Jr. et al. | 395/750 |
| 5,274,824 | 12/1993 | Howarth | 395/725 |
| 5,287,519 | 2/1994 | Dayan et al. | 395/186 |
| 5,313,639 | 5/1994 | Chao | 395/725 |
| 5,375,243 | 12/1994 | Parzych et al. | 395/725 |
| 5,386,552 | 1/1995 | Garney | 395/182.22 |
| 5,388,211 | 2/1995 | Hornbuckle | 395/186 |
| 5,465,349 | 11/1995 | Geronimi et al. | 395/186 |
| 5,475,839 | 12/1995 | Watson et al. | 395/186 |
| 5,652,890 | 7/1997 | Foster | 395/750 |
| 5,987,613 | 11/1999 | Busch et al. | 713/300 |

FOREIGN PATENT DOCUMENTS

| | | |
|---|---|---|
| 0 235 615 | 9/1987 | European Pat. Off. . |
| 0 373 278 | 6/1990 | European Pat. Off. . |
| 0 411 185 | 2/1991 | European Pat. Off. . |
| 0 449 154 | 10/1991 | European Pat. Off. . |
| 449 242 A2 | 10/1991 | European Pat. Off. . |
| 33 47 483 | 7/1985 | Germany . |
| 91 01 296 | 5/1991 | Germany . |
| WO89/00520 | 1/1989 | WIPO . |

*Primary Examiner*—Robert W. Beausoliel, Jr.
*Assistant Examiner*—Scott T. Baderman
*Attorney, Agent, or Firm*—Staas & Halsey LLP

[57] ABSTRACT

A secret information protection system in an information processing system according to the present invention enables prevention of access to secret information by an unauthorized person, and includes; a storage unit for storing secret information to be protected from an unauthorized person; an erasure instructing unit for generating an erasing instruction, and the erasure instructing unit preferably consisting of a switch unit operated by an authorized person or by a cover of the information processing system for generating an ON/OFF signal as the erasing instruction to erase the secret information from the storage unit; and an erasure unit operatively connected to the storage unit for erasing the secret information in accordance with the erasing instruction from the erasure instructing unit.

41 Claims, 12 Drawing Sheets

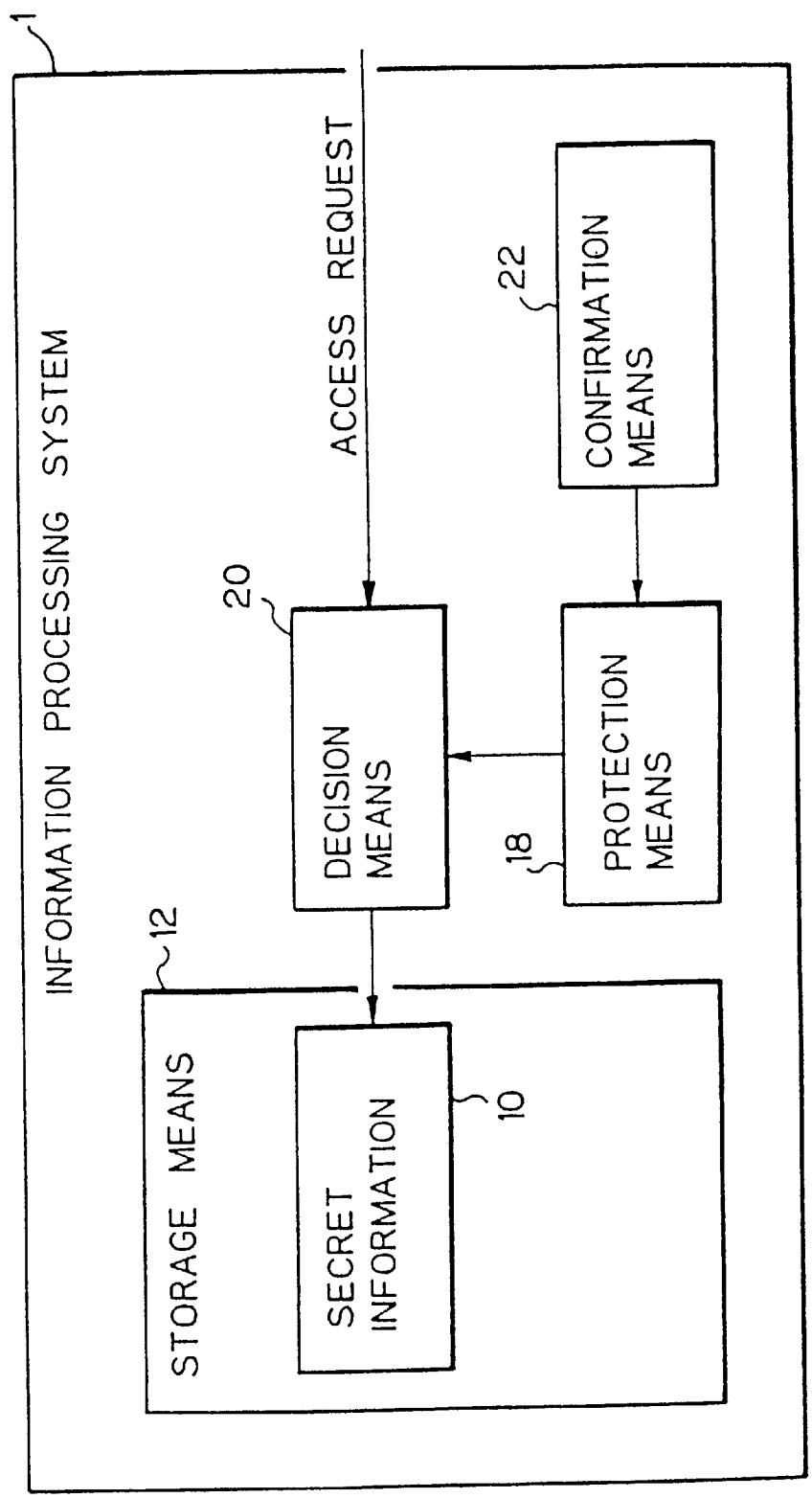

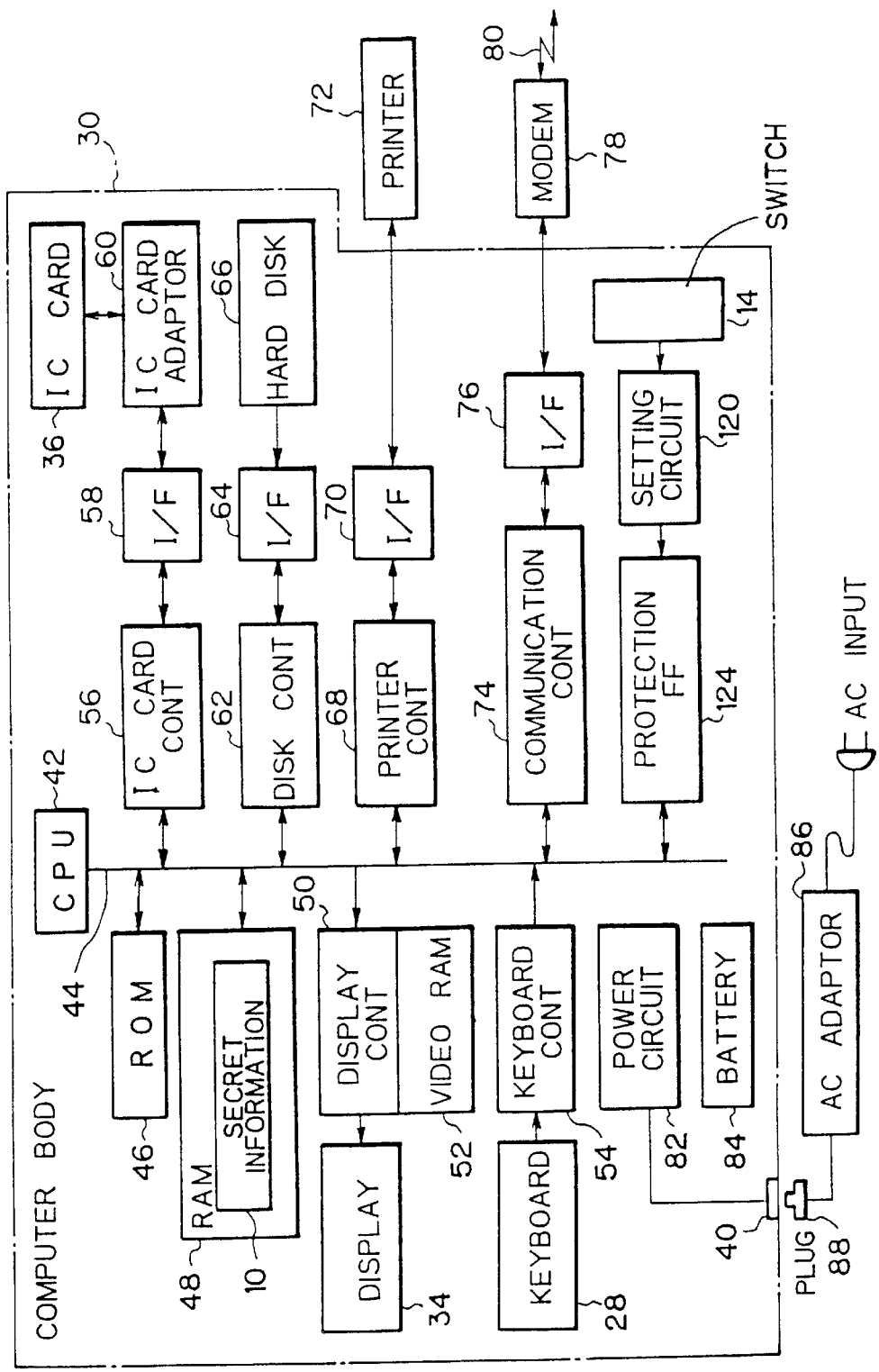

SECRET INFORMATION PROTECTION SYSTEM

This application is a division of application Ser. No. 07/980,706, filed Nov. 24, 1992, now U.S. Pat. No. 5,572,696.

BACKGROUND OF THE INVENTION

1. Field of the Invention

The present invention relates to a secret information protection system in an information processing system, more particularly, it relates to a secret information protection system to prevent access to, and utilization of, secret information stored in a storage means from an unauthorized person.

2. Description of the Related Art

Recently, portable information processing systems, such as a personal computer, a word processor, an electronic pocket notebook (denshi-tetyo in Japanese) and the like, have become wide spread in various fields for use in business and for personal use.

In general, a portable information processing system stores the secret information to be protected, for example, by a business. Accordingly, the secret information must be protected from being accessed by an unauthorized person.

As one example, in a communication system formed by a plurality of members (subscribers) each having a personal computer, each member has an identification code (ID code) or a password to utilize the secret information. In this case, the ID code or the password is usually stored in a storage unit of the personal computer. If the personal computer is stolen and the ID code or the password therein is decoded by an unauthorized person, the system may be illegally used by that person so that fee for use of the system is charged to an authorized member.

As another example, in general, a file or data base is coded by a key-code to protect the secret information stored therein. If the key code is stolen, the secret information can be easily accessed and utilized by an unauthorized person.

SUMMARY OF THE INVENTION

An object of the present invention is to provide a secret information protection system enabling prevention of secret information from being accessed by an unauthorized person.

In accordance with the present invention, there is provided a secret information protection system in an information processing system, includes, a storage unit for storing secret information to be protected from an unauthorized person, an erasure instructing unit for generating an erasing instruction, and the erasure instructing unit preferably consisting of a switch unit operated by an authorized person for generating an ON/OFF signal as the erasing instruction to erase the secret information from the storage unit, and an erasure unit operatively connected to the storage unit for erasing the secret information in accordance with the erasing instruction from the erasure instructing unit.

In one embodiment, a secret information protection system includes, a storage unit for storing secret information to be protected from an unauthorized person, an erasure instructing unit for generating an erasing instruction, and the erasure instructing unit preferably consisting of a cover switch operated in accordance with an opening/closing operation of a cover of the information processing system for generating an ON/OFF signal as the erasing instruction to erase the secret information from the storage unit when the cover is closed, and an erasure unit operatively connected to the storage unit for erasing the secret information in accordance with erasing instruction from the erasure instructing unit.

In another embodiment, a secret information protection system includes, a storage unit for storing secret information to be protected from an unauthorized person, an erasure instructing unit for generating an erasing instruction when it detects disconnection at a connection point for a power source of the secret information protection system, and an erasure unit operatively connected to the storage unit for erasing the secret information in accordance with the erasing instruction from the erasure instructing unit.

In still another embodiment, a secret information protection system includes, a storage unit for storing a secret information to be protected from an unauthorized person, an erasure instructing unit for generating an erasing instruction when it detects disconnection of a telephone line of the secret information protection system based on a change of voltage/current thereof, and an erasure unit operatively connected to the storage unit for erasing the secret information in accordance with the erasing instruction from the erasure instructing unit.

In still another embodiment, a secret information protection system includes, a storage unit for storing secret information to be protected from an unauthorized person, an erasure instructing unit for generating an erasing instruction when it detects disconnection at a connection point for a telephone line of the secret information protection system, and an erasure unit operatively connected to the storage unit for erasing the secret information in accordance with the erasing instruction from the erasure instructing unit.

In still another embodiment, a secret information protection system includes, a storage unit for storing secret information to be protected from an unauthorized person, an erasure instructing unit for generating an erasing instruction when it detects disconnection to a modem connected to the secret information protection system based on a change in voltage/current thereof, and an erasure unit operatively connected to the storage unit for erasing the secret information in accordance with the erasing instruction from the erasure instructing unit.

In still another embodiment, a secret information protection system includes, a storage unit for storing secret information to be protected from an unauthorized person, an erasure instructing unit for generating an erasing instruction when it detects disconnection at a connection point for a modem connected to the secret information protection system, and an erasure unit operatively connected to the storage unit for erasing the secret information in accordance with the erasing instruction from the erasure instructing unit.

In still another embodiment, a secret information protection system includes, a storage unit for storing a secret information to be protected from an unauthorized person, an erasure instructing unit for generating an erasing instruction when it detects disconnection to a packet assembly/disassembly apparatus connected to the secret information protection system based on a change in voltage/current thereof, and an erasure unit operatively connected to the storage unit for erasing the secret information in accordance with the erasing instruction from the erasure instructing unit.

In still another embodiment, a secret information protection system includes, a storage unit for storing secret information to be protected from an unauthorized person, an erasure instructing unit for generating an erasing instruction when it detects disconnection at a connection point for a packet assembly/disassembly apparatus connected to the secret information protection system, an erasure unit operatively connected to the storage unit for erasing the secret information in accordance with the erasing instruction from the erasure instructing unit.

In still another embodiment, secret information protection system includes, a storage unit for storing a secret information to be protected from an unauthorized person, an erasure instructing unit for generating an erasing instruction when it detects removal of an IC card from the secret information protection system based on a change in voltage/current thereof, and an erasure unit operatively connected to the storage unit for erasing the secret information in accordance with the erasing instruction from the erasure instructing unit.

In still another embodiment, a secret information protection system includes, a storage unit for storing secret information to be protected from an unauthorized person, an erasure instructing unit for generating an erasing instruction when it detects removal of an IC card from the secret information protection system based on disconnection of a contact point, and an erasure unit operatively connected to the storage unit for erasing the secret information in accordance with the erasing instruction from the erasure instructing unit.

As another aspect of the present invention, a secret information protection system in an information processing system, includes, a storage unit for storing secret information to be protected from an unauthorized person, a protection unit for prohibiting access to the secret information, a decision unit operatively connected to the storage unit for prohibiting the access to the secret information when the protection unit sets prohibition of the access, and permitting the access to the secret information when the protection unit releases prohibition of the access; and a confirmation unit operatively connected to the protection unit for releasing prohibition of the access for the protection unit after confirmation by an authorized person.

In one preferred embodiment, the protection unit comprises a switch unit to set prohibition of the access, and to switch to a protection state which disables write/read operation of the secret information when an unauthorized person operates the switch unit.

In another preferred embodiment, the protection unit comprises a cover switch to set prohibition of the access when the cover is closed, and to switch to a protection state which disables write/read operation of the secret information.

In still another embodiment, the protection unit detects disconnection at a connection point for a power source of the secret information protection system, and sets prohibition of the access and switches to a protection state which disables write/read operation of the secret information.

In still another embodiment, the protection unit detects disconnection of a telephone line of the secret information protection system based on a change in voltage/current thereof, and sets prohibition of the access and switches to a protection state which disables write/read operation of the secret information.

In still another embodiment, the protection unit detects disconnection at a connection point for the telephone line, and it sets prohibition of the access and switches to a protection state which disables write/read operation of the secret information.

In still another embodiment, the protection unit detects disconnection to a modem connected to the secret information protection system based on a change in voltage/current thereof, and sets prohibition of the access and switches to a protection state which disables write/read operation of the secret information.

In still another embodiment, the protection unit detects disconnection at a connection point for the modem, and sets prohibition of the access and switches to protection state which disables write/read operation of the secret information.

In still another embodiment, the protection unit detects disconnection to a packet assembly/disassembly apparatus connected to the secret information protection system based on a change in voltage/current thereof, and sets prohibition of the access and switches to a protection state which disables write/read operation of the secret information.

In still another embodiment, the protection unit detects disconnection at a connection point for the packet assembly/disassembly apparatus, and sets prohibition of the access and switches to a protection state which disables write/read operation of the secret information.

In still another embodiment, the protection unit detects removal of an IC card from the secret information protection system based on a change in voltage/current thereof, and sets prohibition of the access and switches to a protection state which disables write/read operation of the secret information.

In still another embodiment, the protection unit detects removal of the IC card from the secret information protection system based on disconnection of a contact point, and sets prohibition of the access and switches to protection state which disables write/read operation of the secret information.

In still another embodiment, the confirmation unit releases prohibition of the access for the protection unit when an authorized person inserts a password or unlocks a key of the system, and switches to non-protection state which enables write/read operation of the secret information.

In still another embodiment, the protection unit comprises a switch unit to set a protection state for the secret information when it is turned on, a setting circuit operatively connected to the switch unit to generate a setting signal, and a protection flip-flop circuit operatively connected to the setting circuit to generate a prohibiting signal to the decision unit to prohibit access to the secret information.

BRIEF DESCRIPTION OF THE DRAWINGS

In the drawings:

FIG. 1B shows an essential structure of another aspect of the present invention;

FIG. 13 is a schematic circuit block of a computer body as still another embodiment of the present invention.

DESCRIPTION OF THE PREFERRED EMBODIMENTS

A secret information protection system according to the present invention will be explained in detail hereinafter.

Figure 1A:
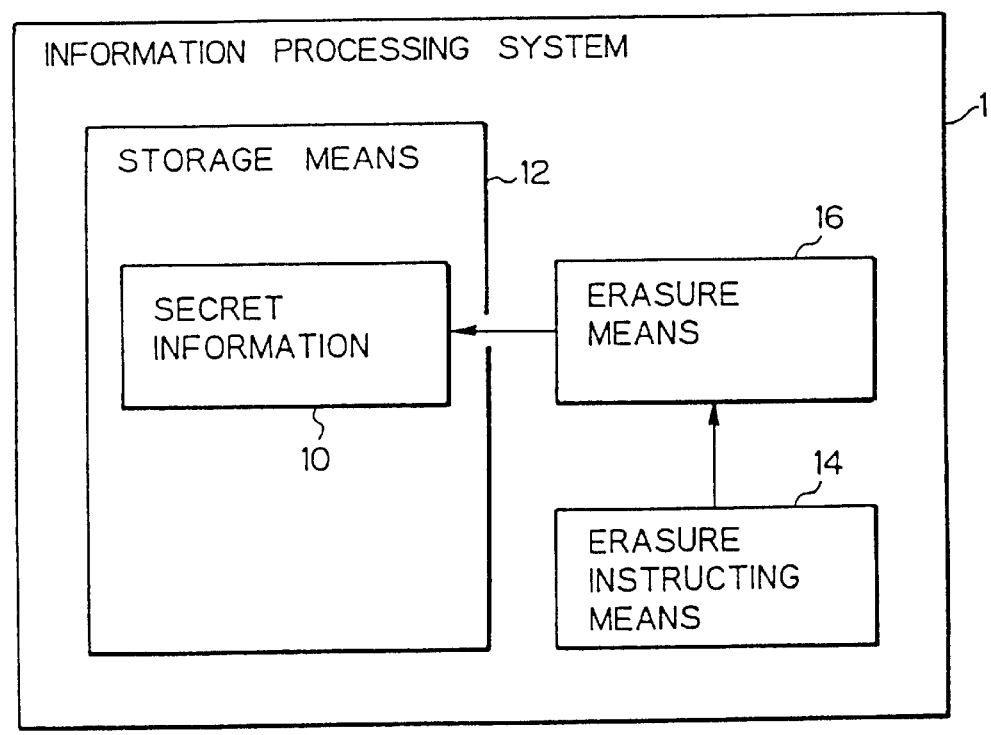
FIG. 1A shows an essential structure of one aspect of the present invention.

FIG. 1A shows an essential structure of one aspect of the present invention. In FIG. 1A, an information processing system 1 substantially includes a storage means 12 for storing secret information 10, an erasure instructing means 14 for instructing the erasure of the secret information 10, and an erasure means 16 for erasing the secret information 10 in accordance with an erasing instruction from the erasure instructing means 14.

The erasure instructing means 14 operates as follows:

(i) It comprises a switch operated by an authorized person. When the switch is operated, the secret information 10 is automatically erased from the storage means 12.

(ii) It comprises a cover switch which is operated by a cover of the system at the time the cover is closed. The secret information 10 is automatically erased when the cover is closed.

(iii) When it detects disconnection at a connection point for a power source of the secret information protection system, it outputs an erasing instruction to the erasure means 10 to automatically erase the secret information 10.

(iv) When it detects disconnection of a telephone line connected to the secret information protection system based on a change in voltage/current thereof, it outputs the erasing instruction to the erasure means 10 to automatically erase the secret information 10.

(v) When it detects disconnection at a connection point for the telephone line, it outputs the erasing instruction to the erasure means 10 to automatically erase the secret information 10.

(vi) When it detects disconnection to a modem connected to the secret information protection system based on change of voltage/current thereof, it outputs the erasing instruction to the erasure means 10 to automatically erase the secret information 10.

(vii) When it detects disconnection at a connection point for the modem, it outputs the erasing instruction to the erasure means 10 to automatically erase the secret information 10.

(viii) When it detects disconnection to a packet assembly/disassembly apparatus connected to the secret information protection system based on a change in voltage/current thereof, it outputs the erasing instruction to the erasure means 10 to automatically erase the secret information 10.

(ix) When it detects disconnection at a connection point for the packet assembly/disassembly apparatus, it outputs the erasing instruction to the erasure means 10 to automatically erase the secret information 10.

(x) When it detects removal of an IC card inserted to the secret information protection system based on a change in voltage/current thereof, it outputs the erasing instruction to the erasure means 10 to automatically erase the secret information 10.

(xi) When it detects removal of the IC card based on disconnection of a contact point, it outputs the erasing instruction to the erasure means 10 to automatically erase the secret information 10.

FIG. 1B shows an essential structure of another aspect of the present invention. In FIG. 1B, an information processing system 1 substantially includes a storage means 12 for storing a secret information 10, a protection means 18 for setting prohibition of an access to the secret information 10, a decision means 20 for prohibiting the access to the secret information 10 when the protection means 18 sets prohibition of access and for permitting the access to the secret information 10 when the protection means 18 releases prohibition of the access, and a confirmation means 22 for confirming an authorized person and releasing prohibition of the access.

The protection means 18 operates as follows:

(a) It comprises a switch means operated by an authorized person. When the authorized person operates the switch, it sets prohibition of the access and switches to a protection state which disables write/read operation of the secret information 10.

(b) It comprises a cover switch which is operated by the authorized person at the time a cover of the system is closed, sets prohibition of the access when the cover is closed, and switches to protection state which disables write/read operation of the secret information 10.

(c) When it detects disconnection at a connection point for a power source, it sets prohibition of the access and switches to a protection state which disables write/read operation of the secret information 10.

(d) When it detects disconnection of a telephone line connected to the secret information protection system based on a change in voltage/current thereof, it sets prohibition of the access and switches to a protection state which disables write/read operation of the secret information 10.

(e) When it detects disconnection at a connection point for the telephone line, it sets prohibition of the access and switches to a protection state which disables write/read operation of the secret information 10.

(f) When it detects disconnection to a modem connected to the secret information protection system based on a change in voltage/current thereof, it sets prohibition of the access and switches to protection state which disables write/read operation of the secret information 10.

(g) When it detects disconnection at a connection point for the modem, it sets prohibition of the access and switches to a protection state which disables write/read operation of the secret information 10.

(h) When it detects disconnection to a packet assembly/disassembly apparatus connected to the secret information protection system based on a change in voltage/current thereof, it sets prohibition of the access and switches to a protection state which disables write/read operation of the secret information 10.

(i) When it detects disconnection at a connection point for the packet assembly/disassembly apparatus, it sets prohibition of the access and switches to a protection state which disables write/read operation of the secret information 10.

(j) When it detects removal of an IC card inserted to the secret information protection system based on a change in voltage/current thereof, it sets prohibition of the access and switches to a protection state which disables write/read operation of the secret information 10.

(k) When it detects removal of the IC card based on disconnection of a contact point, it sets prohibition of the access and switches to a protection state which disables write/read operation of the secret information 10.

Further, the confirmation means 22 releases prohibition of the access for the protection means 18 and switches to a non-protection state which enables write/read operation of the secret information when the operator inputs the password or unlocks a key of the system.

According to the secret information protection system of the present invention, when an authorized person switches the switch, when he cuts off or removes the power source, or when he disconnects the telephone line, the secret information can be automatically erased or be automatically set to a protection state based on the erasing instruction. Accordingly, it is possible to surely protect the secret information by an easy operation without special handling. If the system is accidentally lost or stolen, the secret information can be automatically erased when the power source or telephone line is disconnected.

Figure 2:
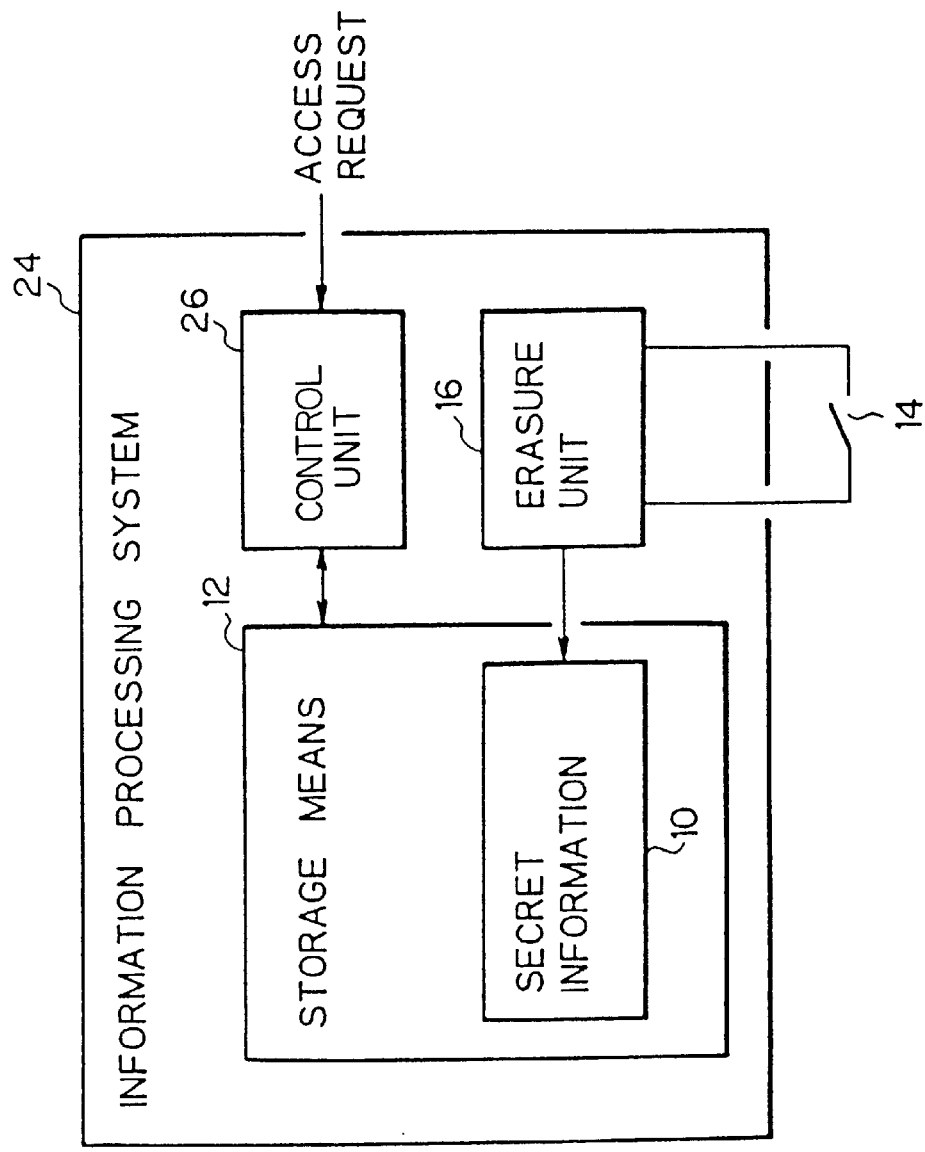
FIG. 2 is a basic block diagram of a secret information protection system according to a first embodiment of the present invention.

FIG. 2 is a basic block diagram of a secret information protection system according to one embodiment of the present invention. In FIG. 2, reference number 24 denotes a portable information processing system, such as a personal computer, a word processor, an electronic pocket notebook and the like. The following explanation is given for a personal computer.

As shown in the drawing, the portable information processing system 24 has the storage means 12 for storing the secret information 10. Further, the system 24 has a control unit 26 for controlling write/read operation and instruction to the storage means 12. An authorized person applies an instruction to the control unit 26 through a keyboard or mouse. Further, the system has an erasure unit 16 and a switch 14. The switch 14 is, for example, provided in a housing information processing of the system 24. When the switch 14 is turned on, an erasing instruction is applied to the erasure unit 16. When the erasure unit 16 receives the erasing instruction, it erases the secret information 10 stored in the storage means 12.

Figure 3:
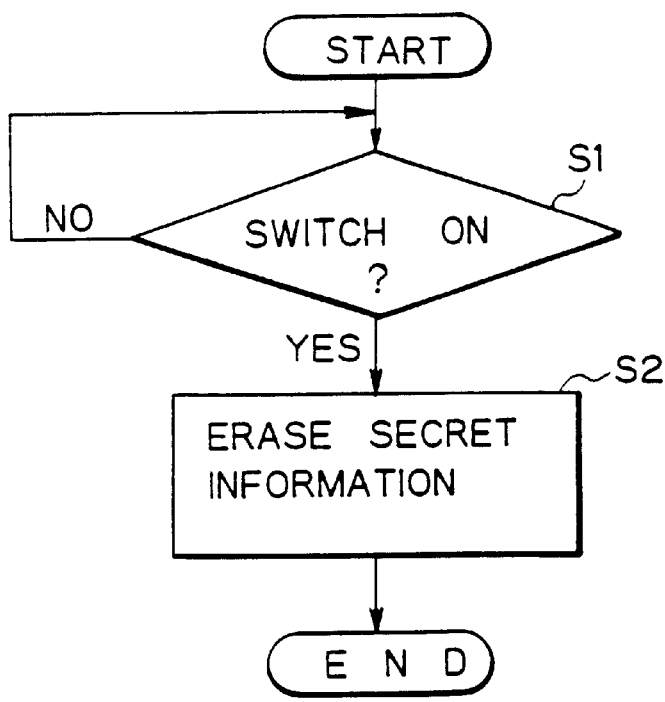
FIG. 3 is a flowchart explaining operation of an erasure unit shown in FIG. 2.

FIG. 3 is a flowchart for explaining operation of the erasure unit 16 shown in FIG. 2. In step S1, the erasure unit detects whether the switch 14 is turned on or off. In step 2, when the switch 14 is turned on, the erasure unit 16 erases the secret information 10 stored in the storage means unit 12.

Figure 4:
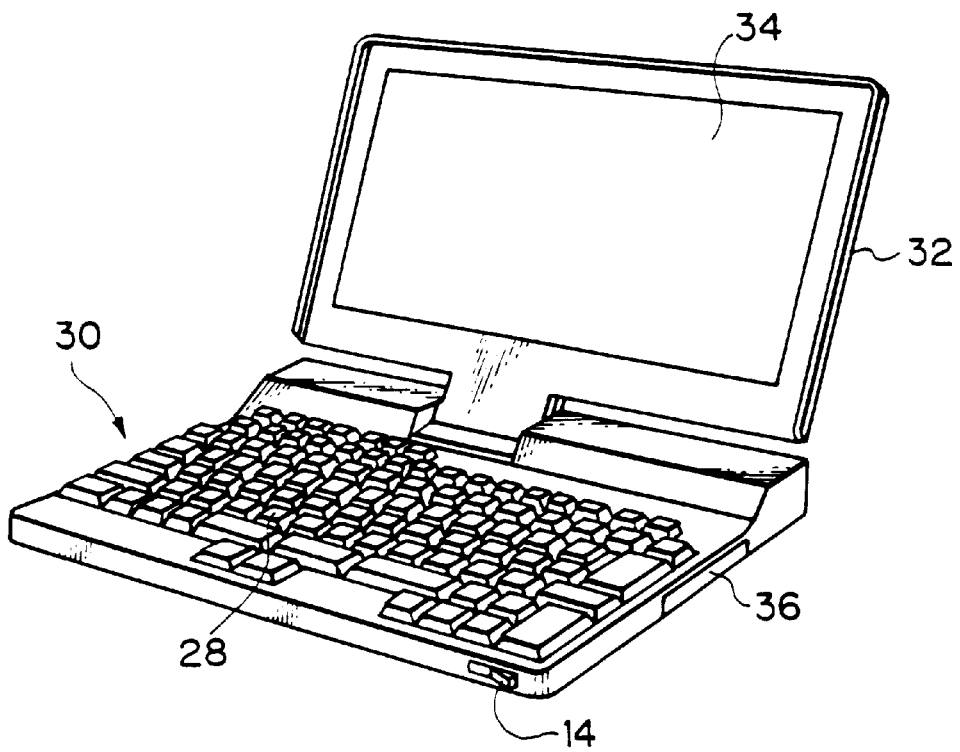
FIG. 4 is a perspective view of so-called "lap-top" type personal computer applying the present invention.
Figure 5:
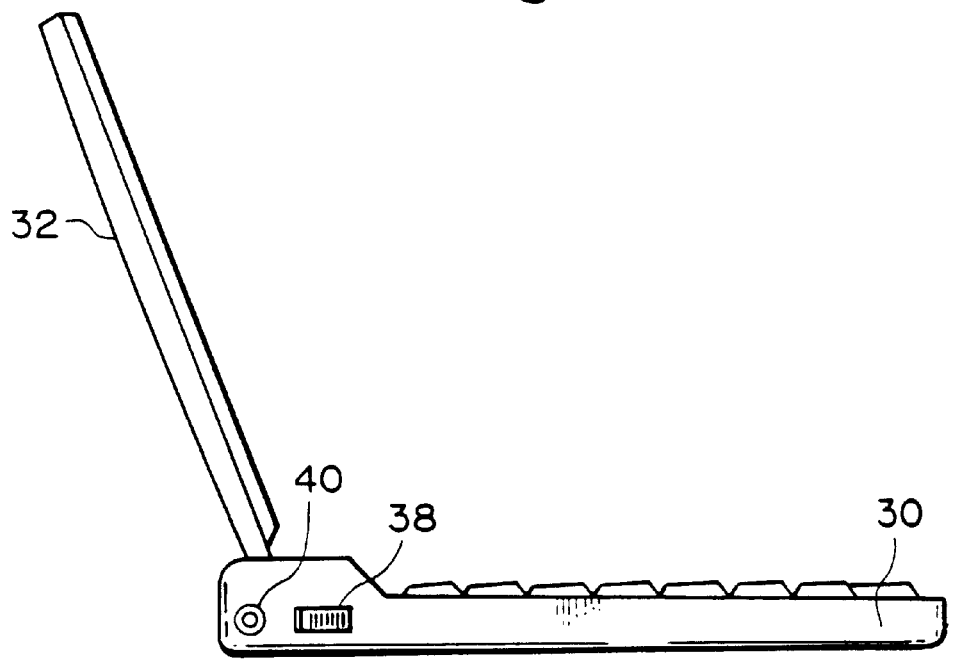
FIG. 5 is a side view of the structure shown in FIG. 4.

FIG. 4 is a perspective view of a so-called "lap-top" type personal computer, and FIG. 5 is a side view of the structure shown of FIG. 4.

In FIG. 4, the lap-top type personal computer includes a switch 14, a keyboard 28, a computer body 30, a cover 32, a display panel 34, and IC card 36. Further, as shown in FIG. 5, the computer has a main switch 38 and a DC connector 40 in the side thereof. The IC card is manually inserted by an authorized person. The DC connector 40 is used for supplying a DC power from an AC adaptor which converts a commercial power into the DC power. When a plug (see, FIG. 6) of the AC adaptor is inserted to the DC connector 40, the power source is changed from a battery to the DC power.

The main switch 38 is manually operated by the operator to turn on/off the power source. Further, the switch 14 is operated in various ways as explained below.

For example, in FIG. 4, the switch 14 is provided at a front side of the computer body 30, and is manually operated by an authorized person when erasing the secret information 10 stored in the storage means 12. The storage means 12 is, for example, a random access memory (below, RAM).

Figure 6:
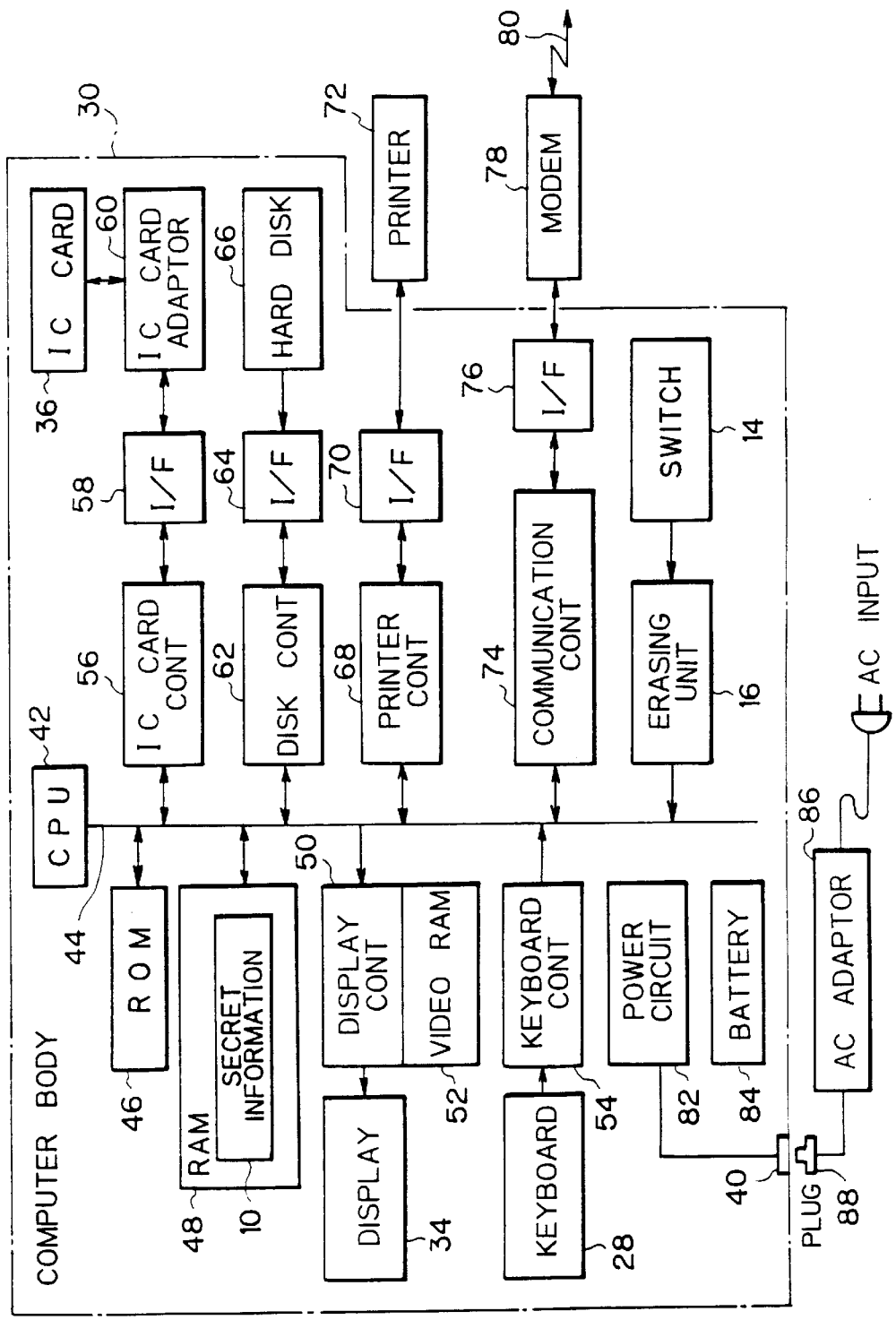
FIG. 6 is a schematic circuit block of a computer body as one embodiment of the present invention.

FIG. 6 is a schematic circuit block of a computer body as one embodiment of the present invention. In FIG. 6, reference number 42 denotes a central processing unit CPU, 44 an internal bus, 46 a read only memory, 50 a display controller (CONT), 52 a video RAM, 54 a keyboard controller (CONT), 56 an IC card controller (CONT), 58 (64, 70, and 76) an interface I/F, 60 an IC card adaptor, 62 a disk controller (CONT), 66 a hard disk, 68 a printer controller (CONT), 72 a printer, 74 a communication controller (CONT), 78 a modem, 80 a communication line, 82 a power circuit, 84 a battery, 86 an AC adaptor, and 88 a plug.

The CPU 42 has the internal bus 44 to control all operation of above units. The ROM 46 stores a control program, and the RAM 48 temporarily stores data. In this embodiment, the RAM 48 stores the secret information 10. The display panel 34 displays contents of the video RAM 52 through the display controller 50. In this case, data of the video RAM 52 may be handled as secret information. The keyboard 28 is connected to the internal bus 44 through the keyboard controller 54.

The IC card 36 is inserted to or removed from the IC adapter 60 which is connected to the internal bus 44 through the interface 58 and the IC card controller 56. The hard disk 66 is connected to the internal bus 44 through the interface 64 and the disk controller 62. The content of the hard disk may be handled as secret information. The printer 72 is connected to the internal bus 44 through the interface 70 and the printer controller 68. The modem 78 is connected to another modem (not shown) through the communication line 80. Further, the modem is connected to the internal bus 44 through the interface 76 and the communication controller 74.

The switch 14 of this drawing corresponds to the switch 14 of FIG. 4. The switch 14 is connected to the erasure unit 16 which connected to the RAM 48 through the internal bus 44. The erasure unit 16 generates, for example, an interruption to the CPU 42 to erase the secret information when the switch 14 is turned on.

The computer body 30 has the power circuit 82 and the battery 84 connected thereto. Further, the power circuit 82 has the DC connector 40 which is connected to the plug 88 of the AC adapter 86. The AC adapter 86 is connected to the AC power source.

Figure 7:
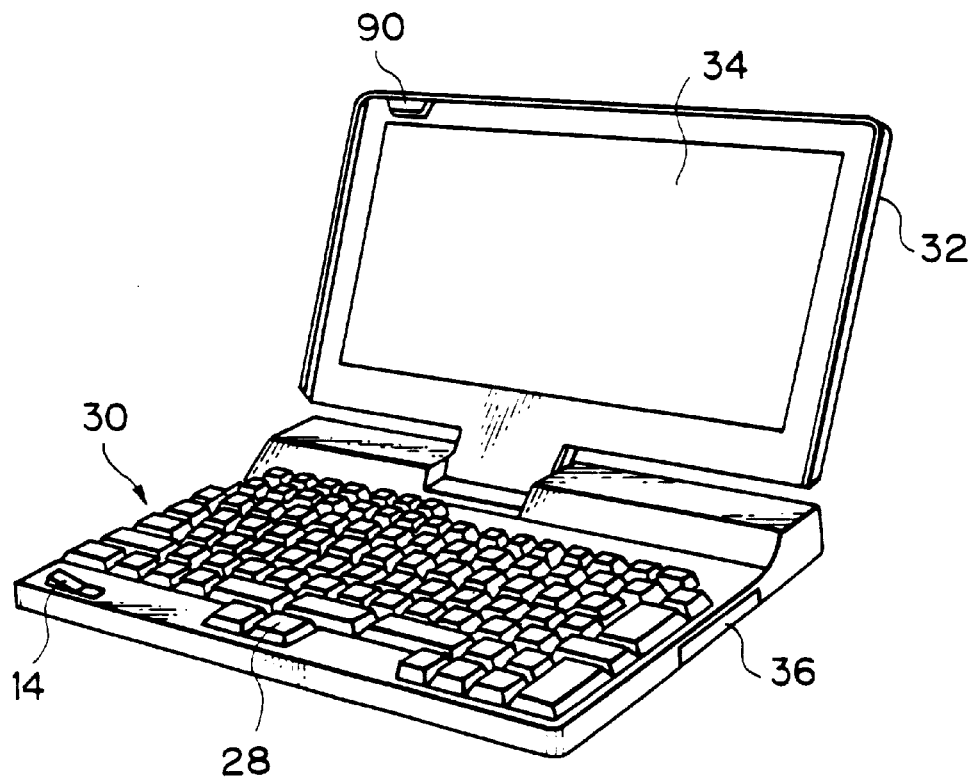
FIG. 7 is a perspective view of another example of the lap-top type personal computer applying the present invention.

FIG. 7 is a perspective view of another example of the lap-top type personal computer. In FIG. 7, reference number 90 denotes a projection provided on the cover 32. In this embodiment, the switch 14 is provided on the surface of the computer body 30, and the switch 14 is turned on by the projection 90 when the cover 32 is closed.

That is, the switch 14 is turned off when the cover 32 is opened so that the erasing instruction is not output from the switch 14. Further, when the cover 32 is closed, the switch 14 is turned on by the projection 90 so that the erasing instruction is automatically output to the erasure unit 16 and the secret information 10 is erased by the erasure unit 16. As is obvious from the above explanation, it is possible to easily erase the secret information without complex operation of the system.

Figure 8:
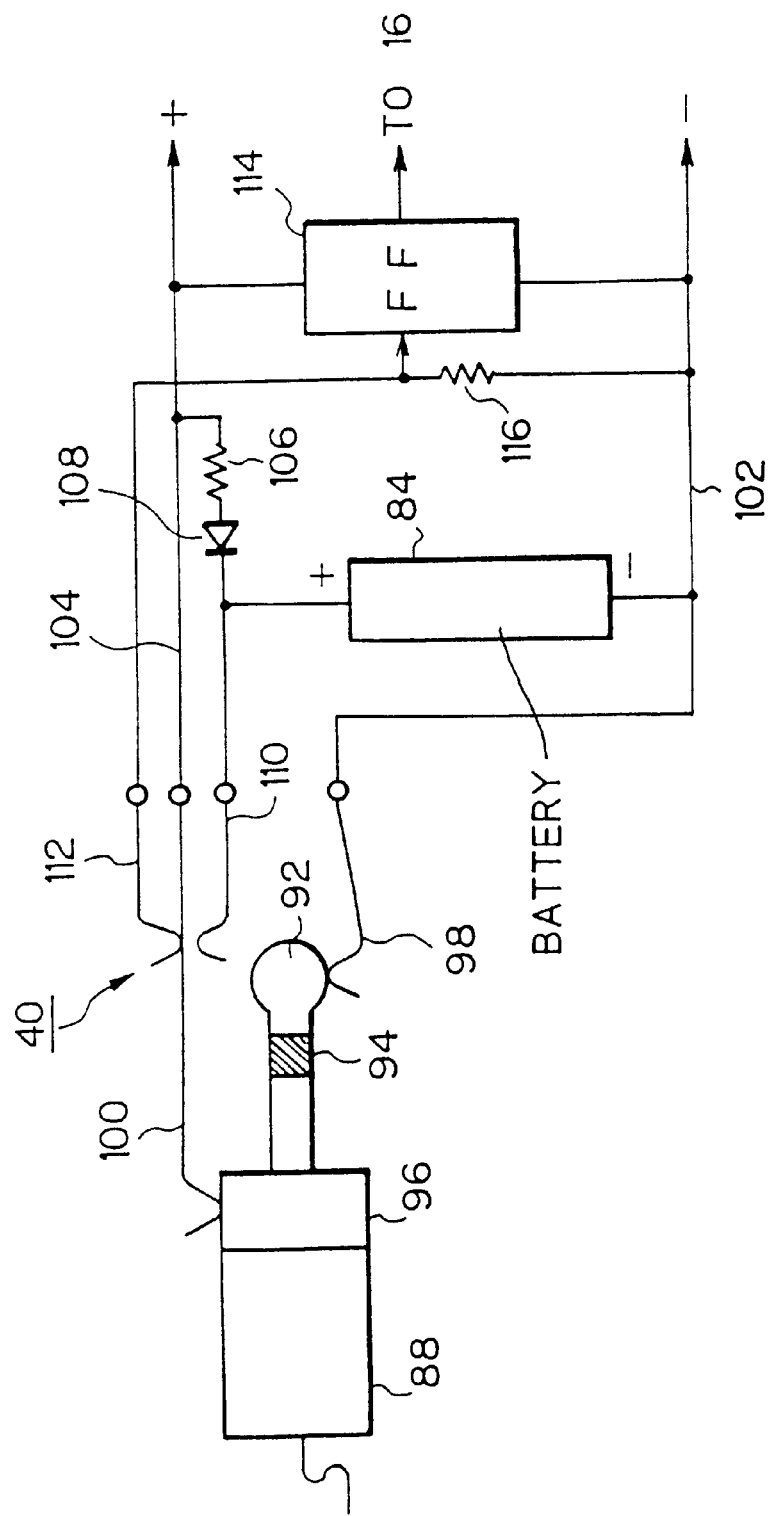
FIGS. 8 and 9 are detailed circuit diagrams of an erasing instruction means according to the embodiment of the present invention.
Figure 9:
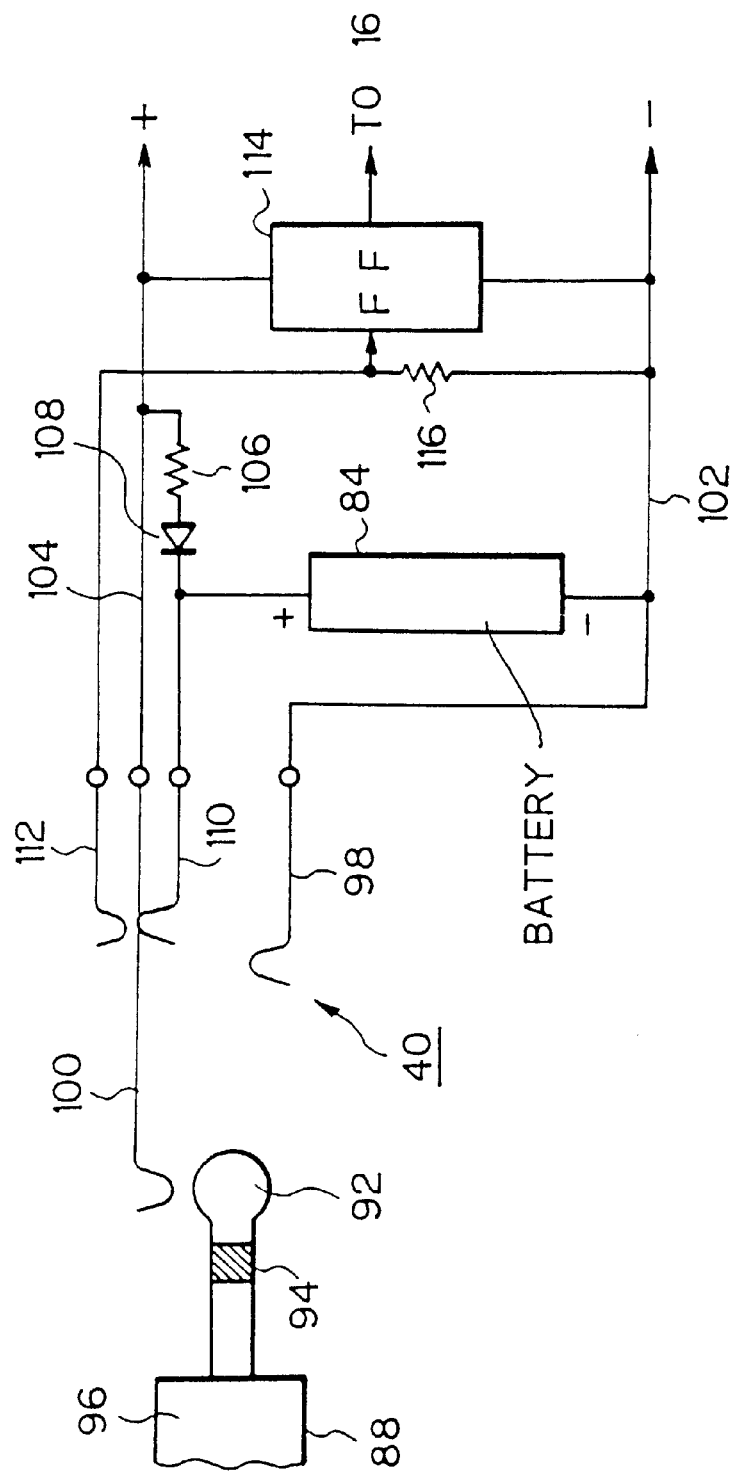

FIGS. 8 and 9 are detailed circuit diagrams of an erasing instruction means according to another embodiment. FIG. 8 shows an insertion state of the plug, and FIG. 9 shows a removal state of the plug. In these drawings, when the plug 88 is removed from the DC connector 40, the secret information is automatically erased as explained in detail below.

As shown in FIG. 8, the plug 88 of the AC adaptor 86 is inserted into the connector 40. The plug 88 has electrodes 92 and 96, and the electrode 92 is provided for a top of the plug 88 and the electrode 96 is located a rear portion of an isolation portion 94. In this case, the electrode 92 is minus and the electrode 96 is plus. The DC connector 40 has a contact member 98 connected to the electrode 92 and an outer contact member 100 contacted to the electrode 96. Further, the contact member 98 is connected to an internal minus line 102, and the contact member 100 is connected to an internal plus line 104.

A plus pole of the battery 84 is connected to a switch member 110, and connected to the plus line 104 through a resistor 106 and a diode 108. A minus of the battery 84 is connected to the contact member 98 and the minus line 102. The switch member 110 is disconnected from the plus line 104 since the contact point 100 is outwardly deformed by the plug 88 when it is inserted. Contrary, a switch member 112 is connected to the plus line 104 when the plug 88 is inserted.

Further, a flip-flop circuit 114 is connected between the plus line 104 and the minus line 102, and an output of the flip-flop circuit is connected to the erasure unit 16. A resistor 116 is an input resistor connected between the minus line 102 and the switch member 112.

In the state of FIG. 8, the plus DC voltage from the contact member 96 is supplied to the plus line 104, and the minus DC voltage from the contact member 92 is supplied to the minus line 102. Accordingly, the DC voltage is supplied to the power circuit, and the battery 84 is charged through the resistor 106 and the diode 108 since the switch member 110 is disconnected. Further, since the input of the flip-flop becomes high through the switch member 112, the flip-flop 114 is set to a "set state" so that it does not output the erasing instruction to the erasure unit 16.

In the state of FIG. 9, the DC voltage is supplied from the battery 84 through the switch member 110 and the minus line 102. That is, when the plug 88 is removed from the DC connector 40, the switch member 110 is disconnected from the switch member 112 and connected to the contact point 100. In this case, the input of the flip-flop 114 is changed from a high level to a low level so that it is set to a "reset state". The flip-flop 114 outputs the erasing instruction to the erasure unit 16 in the "reset state" so that it is possible to automatically erase the secret information.

Figure 10:
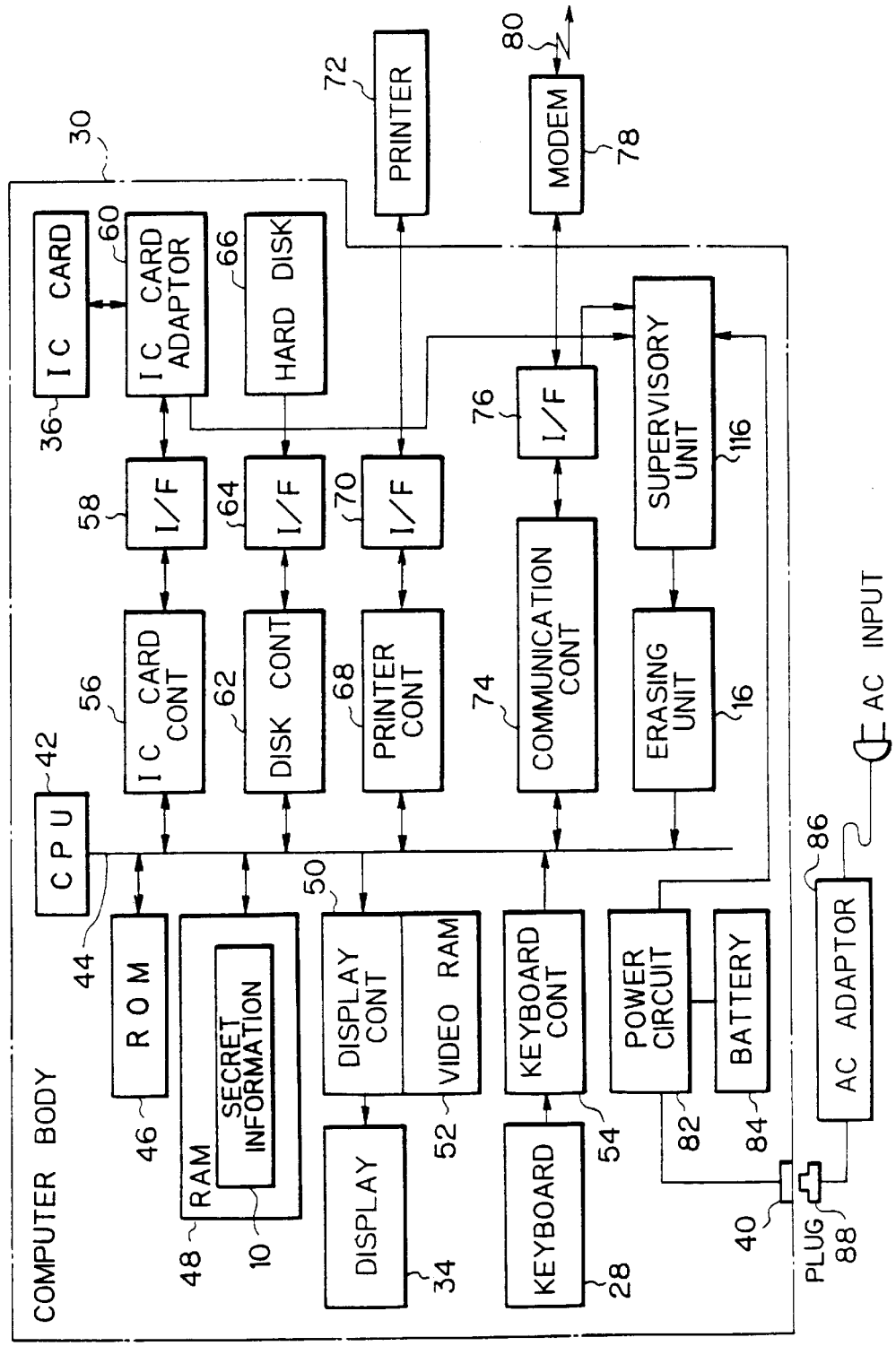
FIG. 10 is a schematic circuit block of a computer body as another embodiment of the present invention.

FIG. 10 is a schematic circuit block of a computer body as another embodiment of the present invention. The same reference numbers as used in FIG. 6 are attached to the same components in this drawing. Reference number 116 denotes a supervisory unit for outputting the erasing instruction to the erasure unit 16. Briefly the supervisory unit 116 supervises insertion/removal of the IC card 36 to the IC adaptor 60, the state of the modem 78 connected to the communication line 80, and the state of the power supplied from an external power source to the power circuit 82.

The supervisory unit 116 has the following functions.

(1) It detects disconnection of a contact of the power supplied from the external power source, and outputs the erasing instruction to the erasure unit 16.
(2) It detects disconnection of the telephone line 80 connected to the modem 78 based on the change in the voltage/current of the telephone line 80, and outputs the erasing instruction to the erasure unit 16.
(3) It detects disconnection of the contact, for example, a modular-jack of the telephone line 80, and outputs the erasing instruction to the erasure unit 16.
(4) It detects disconnection of the modem 78 based on the change in the voltage/current thereof, for example, existence/non-existence of a carrier, and it outputs the erasing instruction when the carrier does not exist.
(5) It detects disconnection of a cable connected to the modem 78, and outputs the erasing instruction to the erasure unit 16.
(6) It detects disconnection of a packet assembly/disassembly apparatus connected to the secret information protection system based on the change in voltage/current thereof, and it outputs the erasing instruction to the erasure unit 16.
(7) It detects disconnection at a connection point for the packet assembly/disassembly apparatus, and it outputs the erasing instruction to the erasure unit 16.
(8) It detects removal of an IC card from the IC card adaptor 60 based on the change in voltage/current thereof, and it outputs the erasing instruction to the erasure unit 16.
(9) It detects removal of the IC card from the IC adaptor 60 based on disconnection thereof, and it outputs the erasing instruction to the erasure unit 16.

Figure 11:
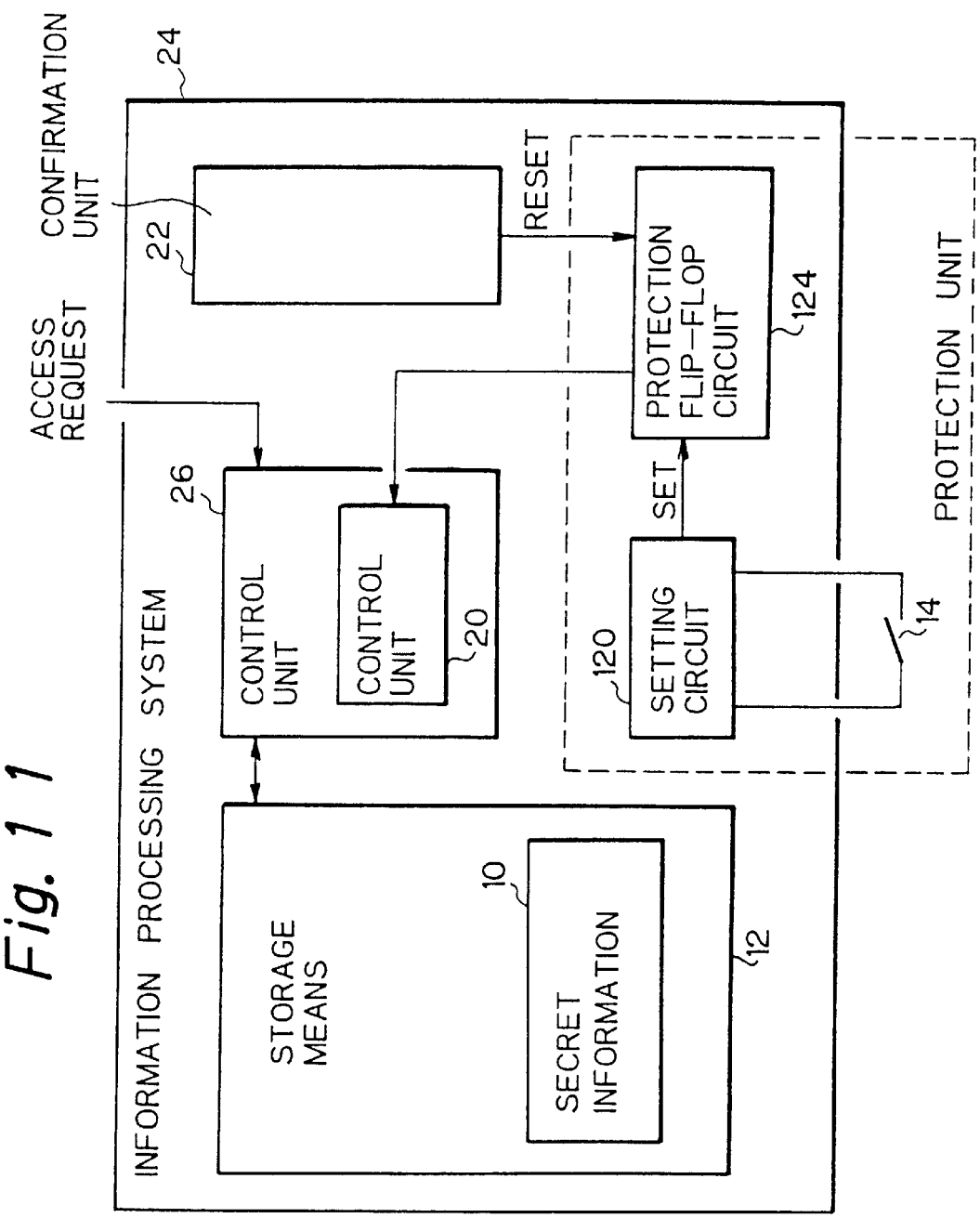
FIG. 11 is a basic block diagram of a secret information protection system according to a second embodiment of the present invention.

FIG. 11 is a basic block diagram of a secret information protection system according to a second embodiment of the present invention. In FIG. 11, the same reference numbers as used in previous drawings are attached to the same components in this drawing. The control unit 26 has a control unit 20. This control unit 20 corresponds to the control unit 20 in FIG. 1B. Further, the portable information processing apparatus has a protection unit 18 which corresponds to the protection means 18 of FIG. 1B. The protection unit 18 has a setting circuit 120 and a protection flip-flop circuit 124. The switch 14 is connected to the setting circuit 120. The setting circuit 120 generates a set signal to the protection flip-flop circuit 124 based on the ON/OFF state of the switch 14 to perform a set operation therefor. Further, the confirmation unit 22 generates a reset signal to the protection flip-flop circuit 124 to perform a reset operation therefor.

When the portable information processing system 24 is turned on, the protection flip-flop circuit 124 enters a reset state and generates an instruction for a non-protection state to the control unit 20. At this time, the control unit 26 can access the secret information 10 in response to the access request.

When the switch 14 is turned on, the setting circuit 120 sets the protection flip-flop circuit 124 to a protection state. In this protection state, when the control unit 26 receives an access request, the control unit 20 decides the protection state of the protection flip-flop circuit 124. If this access request is performed to the secret information 10, the decision unit 20 prohibits this access request. Accordingly, since the system can be easily set to the protection state, it is possible for an operator to easily protect the secret information during his absence.

The protection flip-flop circuit 124 in the set state (i.e., protection state) is reset by the reset signal from the confirmation unit 22 after confirmation of an authorized person. As a result, the protection flip-flop circuit 124 is set to a non-protection state. The confirmation of the authorized person is performed based on, for example, the ID card and the password.

In the above, the protection flip-flop circuit 124 is reset at the time the power is turned on. Further, the following steps are necessary for absolute protection. That is, the protection flip-flop circuit 124 is set at the time the power is turned on, the confirmation unit 22 confirms the authorized person, and the protection flip-flop circuit 124 is reset after confirmation.

Figure 12:
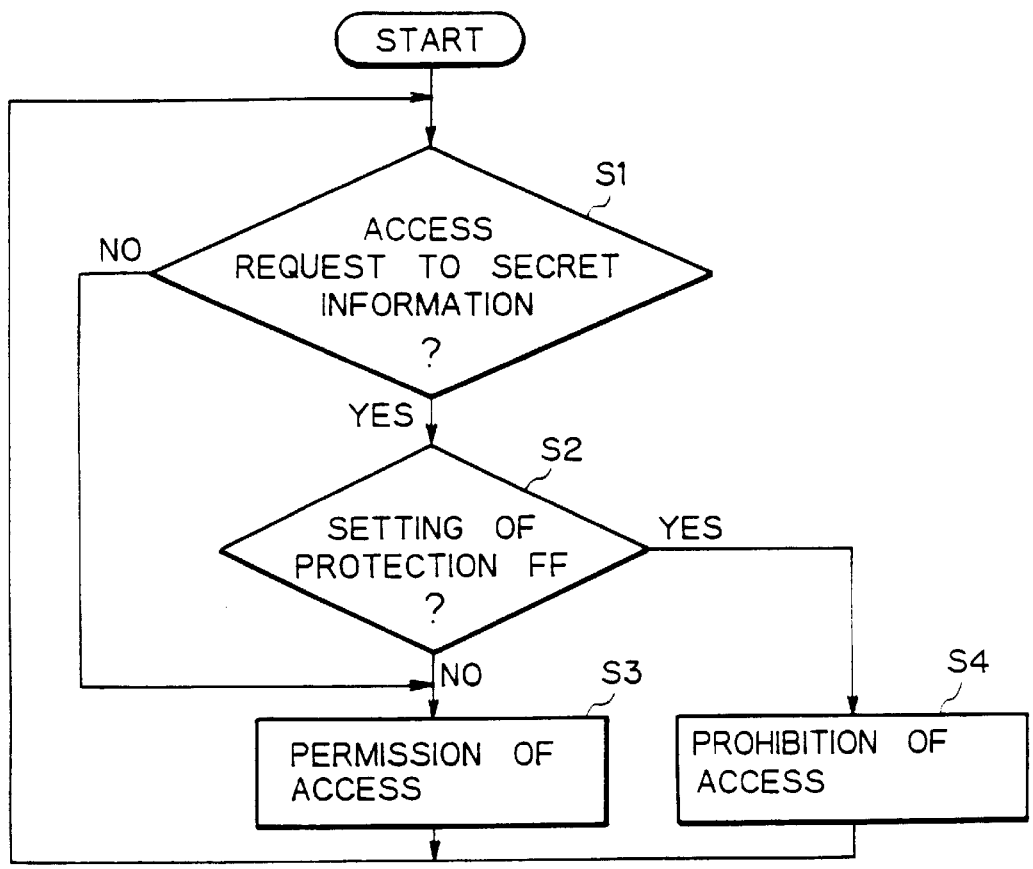
FIG. 12 is a flowchart explaining operation of a decision unit shown in FIG. 11.

FIG. 12 is a flowchart for explaining operation of the decision unit in FIG. 11. In step S1, the decision unit detects whether or not the access to the secret information is requested when the power is turned on. When the access does not request the secret information (NO), the access is permitted by the control unit 20 in step S3.

In step 2, when the access requests the secret information (YES), the decision unit detects whether or not the protection flip-flop circuit 124 is set to the protection state (i.e., set state). When the protection flip-flop circuit 124 is in the non-protection state (i.e., reset state) (NO), the access is permitted by the decision unit 20 in step S3.

When the protection flip-flop circuit 124 is in the protection state (i.e., set state) (YES), the access is prohibited by the control unit 20 in step S4.

FIG. 13 is a schematic circuit block diagram of a computer body as still another embodiment of the present invention. The same reference numbers as used in FIG. 10 are attached to the same components in this drawing. Reference number 120 denotes the setting circuit, and 124 denotes the protection flip-flop circuit. When the IC card 36 is inserted into the IC adapter 60, the content of the IC card is sent to the CPU through the IC card controller and the internal bus 44. The CPU 42 confirms the authorized person and generates the reset signal to the protection flip-flop circuit 124 through the internal bus 44. As a result, the protection flip-flop circuit 124 is set to the non-protection state.

The switch 14 of FIG. 13 can be applied as the switch 14 provided at the front of the computer body 30 as shown in FIG. 4, at the switch 14 provided at the surface of the computer body 30 as shown in FIG. 7, or by the connector 40/plug 88 as shown in FIGS. 8 and 9.

Further, the protection flip-flop circuit 124 in FIG. 13 may be substituted for the flip-flop circuit 114 in FIGS. 8 and 9.

Further, the switch 14 may be substituted for the supervisory unit 116 shown in FIG. 10. In this case, when the supervisory unit 116 detects any one of states explained in steps (1) to (9) relating to FIG. 10, the setting circuit 120 outputs the set signal to the protection flip-flop circuit 124 to provide the protection state of the protection flip-flop circuit 124 prohibiting the access of the secret information 10.

The above embodiment explains automatic erasure of the secret information and protection modes for inhibition of the access thereto. Further, it is possible to switch the mode between automatic erasure and protection when the IC card or the password is inserted into the IC adaptor. In this case, a particular code for the IC card or the password is needed to protect the secret information.

Further, although the above explanation is given in relation to the "lap-top" type personal computer as the portable information processing system, it is easily understooding that the present invention can be applied to a word processor, an electronic pocket notebook, and the like.

What is claimed is:

1. An information protection system for protecting information from an unauthorized user, the information protection system comprising:

a storage unit storing the information;

protection means for setting the information protection system from a non-protection state into a prohibition of access state responsive to detection that a predetermined setting event has occurred, and for releasing the information protection system from the prohibition of access state into the non-protection state responsive to a reset signal;

decision means for prohibiting access to the information stored in the storage unit when the protection means sets the information protection system into the prohibition of access state, and for permitting access to the information stored in the storage unit when the protection means releases the information protection system from the prohibition of access state;

confirmation means for generating the reset signal when an authorized person inputs a password or unlocks a key of the information protection system and the information protection system is in the prohibition of access state, thereby causing the protection means to release the information protection system from the prohibition of access state upon confirmation of an authorized person; and switching means for switching the mode of the information protection system between a first mode in which the protection means is enabled and a second mode in which the protection means is not enabled.

2. An information protection system as claimed in claim 1, wherein:

said protection means comprises a switch to set the information protection system into the prohibition of access state; and the predetermined setting event comprises actuation of the switch by an authorized person.

3. An information protection system as claimed in claim 1, further comprising a cover which opens and closes, and wherein:

said protection means comprises a switch which sets the information protection system into the prohibition of access state; and the predetermined setting event comprises closing the cover.

4. An information protection system as claimed in claim 1, wherein:

a power source is connected to, and provides power to, the information protection system;

said protection means comprises a detector for detecting disconnection of the power source to the information protection system; and the predetermined setting event comprises disconnection of the power source from the information protection system.

5. An information protection system as claimed in claim 1, wherein:

a telephone line is connected to the information protection system;

said protection means comprises a detector for detecting disconnection of the telephone line to the information protection system based on a change in one of voltage and current of the telephone line; and the predetermined setting event comprises disconnection of the telephone line from the information protection system.

6. An information protection system as claimed in claim 1, wherein:

a telephone line is connected to the information protection system;

said protection means comprises a detector for detecting disconnection of the telephone line to the information system; and the predetermined setting event comprises disconnection of the telephone line from the information protection system.

7. An information protection system as claimed in claim 1, wherein:

a modem is connected to the information protection system;

said protection means comprises a detector for detecting disconnection of the modem to the information protection system based on change of one of voltage and current of the connection between the modem and the information system; and the predetermined setting event comprises disconnection of the modem from the information protection system.

8. An information protection system as claimed in claim 1, wherein:

a modem is connected to the information protection system;

said protection means comprises a detector for detecting disconnection of the modem to the information protection system; and the predetermined setting event comprises disconnection of the modem from the information protection system.

9. An information protection system as claimed in claim 1, wherein:

a packet assembly/disassembly apparatus is connected to the information protection system to transmit information to and from the information protection system;

said protection means comprises a detector for detecting disconnection of the packet assembly/disassembly apparatus to the information protection system based on a change in one of voltage and current in the connection between the packet assembly/disassembly apparatus and the information protection system; and the predetermined setting event comprises disconnection of the packet assembly/disassembly apparatus from the information protection system.

10. An information protection system as claimed in claim 1, wherein:

a packet assembly/disassembly apparatus is connected to the information protection system to transmit information to and from the information protection system;

said protection means comprises a detector for detecting disconnection of the packet assembly/disassembly apparatus to the information protection system; and the predetermined setting event comprises disconnection of the packet assembly/disassembly apparatus from the secret information protection system.

11. An information protection system as claimed in claim 1, wherein:

the information protection system includes an IC card;

said protection means comprises a detector for detecting removal of the IC card from the information protection system based on a change in one of voltage and current of the IC card; and the predetermined setting event comprises removal of the IC card from the information protection system.

12. An information protection system as claimed in claim 1, wherein:

the information protection system includes an IC card;

said protection means comprises a detector for detecting removal of the IC card from the information protection system; and the predetermined setting event comprises removal of the IC card from the information protection system.

13. An information protection system for protecting information from an unauthorized user, the information protection system comprising:

a storage unit storing the information;

protection means for setting the information protection system into a prohibition of access state, and for releasing the information protection system from the prohibition of access state;

decision means for prohibiting access to the information stored in the storage unit when the protection means sets the information protection system into the prohibition of access state, and for permitting access to the information stored in the storage unit when the protection means releases the information protection system from the prohibition of access state;

confirmation means for causing, when the information protection system is in the prohibition of access state, the protection means to release the information protection system from the prohibition of access state after confirmation of an authorized person, said confirmation means causing said protection means to release the information protection system from the prohibition of access state when an authorized person inputs a password or unlocks a key of the information protection system; and switching means for switching the mode of the information protection system between a first mode in which the protection means is enabled and a second mode in which the protection means is not enabled;

wherein said protection means comprises:

a switch having a first position and a second position;

a setting circuit which generates a setting signal when the switch is in the first position; and a protection flip-flop circuit which receives the setting signal generated by the setting circuit, generates a prohibiting signal upon receipt of the setting signal and supplies the prohibiting signal to the decision means, the decision means prohibiting access to the information upon receipt of the prohibiting signal and causing the information protection system to prohibit access to the information when the switch is in the first position.

14. A lap top computer, comprising:

storage storing information;

a processor performing processing and accessing the information; and a user access termination system detecting when a user has finished accessing said information, said system comprising:

a cover switch detecting access termination when a cover is closed;

a power source detector detecting access termination when an external power source is disconnected;

a communication port detector detecting access termination when a communication port is disconnected; and a card detector detecting access termination when a circuit card is removed; and an access controller controlling access to said information, said access controller prohibiting access to said information responsive to any one of the detecting access termination and said processor continuing to perform other processing when access is prohibited.

15. An information protection system for protecting information from an unauthorized user, the information protection system comprising:

a storage unit storing the information;

protection means for setting the information protection system into a prohibition of access state, and for releasing the information protection system from the prohibition of access state;

decision means for prohibiting access to the information stored in the storage unit when the protection means sets the information protection system into the prohibition of access state, and for permitting access to the information stored in the storage unit when the protection means releases the information protection system from the prohibition of access state;

confirmation means for causing, when the information protection system is in the prohibition of access state, the protection means to release the information protection system from the prohibition of access state after confirmation of an authorized person, said confirmation means causing said protection means to release the information protection system from the prohibition of access state when an authorized person inputs a password or unlocks a key of the information protection system; and one-way switching means for switching the information protection system into a first mode from a second mode, the information protection system being in the prohibition of access state in the first mode and not in the prohibition of access state in the second mode, whereby the information can be protected by operating said one-way switching means.

16. An information protection system as claimed in claim 15, wherein said protection means comprises a switch to set the information protection system into the prohibition of access state when an authorized person operates the switch.

17. An information protection system as claimed in claim 15, further comprising a cover which opens and closes, wherein said protection means comprises a switch which sets the information protection system into the prohibition of access state when the cover is closed.

18. An information protection system as claimed in claim 15, wherein a power source is connected to, and provides power to, the information protection system and said protection means detects disconnection of the power source to the information protection system and sets the information protection system into the prohibition of access state upon said detection.

19. An information protection system as claimed in claim 15, wherein a telephone line is connected to the information protection system and said protection means detects disconnection of the telephone line to the information protection system based on a change in one of voltage and current of the telephone line and sets the information protection system into the prohibition of access state upon said detection.

20. An information protection system as claimed in claim 15, wherein a telephone line is connected to the information protection system and said protection means detects disconnection of the telephone line to the information system and sets the information protection system into the prohibition of access state upon said detection.

21. An information protection system as claimed in claim 15, wherein a modem is connected to the information protection system and said protection means detects disconnection of the modem to the information protection system based on change of one of voltage and current of the connection between the modem and the information system and sets the information protection system into the prohibition of access state upon said detection.

22. An information protection system as claimed in claim 15, wherein a modem is connected to the information protection system and said protection means detects disconnection of the modem to the information protection system and sets the information protection system into the prohibition of access state upon said detection.

23. An information protection system as claimed in claim 15, wherein a packet assembly/disassembly apparatus is connected to the information protection system to transmit information to and from the information protection system and said protection means detects disconnection of the packet assembly/disassembly apparatus to the information protection system based on a change in one of voltage and current in the connection between the packet assembly/disassembly apparatus and the information protection system and sets the information protection system into the prohibition of access state upon said detection.

24. An information protection system as claimed in claim 15, wherein a packet assembly/disassembly apparatus is connected to the information protection system to transmit information to and from the information protection system and said protection means detects disconnection of the packet assembly/disassembly apparatus to the information protection system and sets the information protection system into the prohibition of access state upon said detection.

25. An information protection system as claimed in claim 15, wherein the information protection system includes an IC card and said protection means detects removal of the IC card from the information protection system based on a change in one of voltage and current of the IC card and sets the information protection system into the prohibition of access state upon said detection.

26. An information protection system as claimed in claim 15, wherein the information protection system includes an IC card and said protection means detects removal of the IC card from the information protection system and sets the information protection system into the prohibition of access state upon said detection.

27. An information protection system as claimed in claim 15, wherein said protection means comprises:

a switch having a first position and a second position;

a setting circuit which generates a setting signal when the switch is in the first position; and a protection flip-flop circuit which receives the setting signal generated by the setting circuit, generates a prohibiting signal upon receipt of the setting signal and supplies the prohibiting signal to the decision means, the decision means prohibiting access to the information upon receipt of the prohibiting signal and causing the information protection system to prohibit access to the information when the switch is in the first position.

28. An information protection system for protecting information from unauthorized access, the information protection system comprising:

a protection unit setting said information protection system from a non-protection state into a protection state responsive to detection that a predetermined setting event has occurred and releasing said information protection system from the protection state into the non-protection state responsive to a reset signal;

a control unit coupled to said protection unit and to a storage of an information processing system, the storage storing the information, said control unit prohibiting access to the information when said information protection system is in the protection state and permitting access to the information when said information protection system is in the non-protection state; and a confirmation unit generating the reset signal responsive to at least one of inputting a password and unlocking a key of said information protection system when said information protection system is in the protection state, thereby causing said protection unit to switch said information protection system from the protection state to the non-protection state.

29. An information protection system as claimed in claim 28, wherein the predetermined setting event comprises at least one of actuation of a switching means, disconnection at a power connection point, disconnection at an information connection point, and removal of an access authorization device from connection with said information protection system.

30. An information protection system as claimed in claim 28, wherein:
said protection unit comprises a switch; and
the predetermined setting event comprises actuation of the switch;
whereby said information protection system is set into the protection state when said information protection system is in the non-protection state and a user operates the switch.

31. An information protection system as claimed in claim 28, further comprising a cover moveable between an open position and a closed position, and wherein:
said protection unit further comprises a switch actuated by moving said cover into the closed position; and
the predetermined setting event comprises actuation of the switch;
whereby said protection unit sets said information protection system into the protection state when said cover is moved to the closed position.

32. An information protection system as claimed in claim 29, wherein the power connection point connects said information protection system to a power source supplying power thereto.

33. An information protection system as claimed in claim 29, wherein the information connection point connects said information protection system to one of a telephone line, a modem, and a packet assembly/disassembly apparatus.

34. An information protection system as claimed in claim 29, wherein the access authorization device comprises an IC card connectable with said secret information protection system by insertion of the IC card into an IC card adapter coupled to said information protection system.

35. An information protection system for protecting information from unauthorized access, the information protection system comprising:
a protection unit setting said information protection system into a protection state responsive to detection of a predetermined setting event and releasing said information protection system from the protection state responsive to a reset signal;
a control unit coupled to said protection unit and to a storage of the information processing system, the storage storing the information, said control unit prohibiting access to the information when said information protection system has been set to the protection state; and
a confirmation unit generating the reset signal to release said information protection system from the protection state responsive to at least one of inputting a password and unlocking a key of said information protection system, thereby switching said information protection system to a non-protection state in which said control unit permits access to the information;
wherein said protection unit comprises:
a setting circuit generating a set signal based on an ON/OFF state of a switch connected thereto; and
a protection circuit setting said information protection system into the protection state responsive to the set signal from the setting circuit and said information protection system into the non-protection state responsive to the reset signal from said confirmation unit.

36. An information protection method for protecting information from unauthorized access, the method comprising:
setting an information processing system from a non-protection state into a protection state responsive to detection that a predetermined setting event has occurred;
releasing the information protection system from the protection state into the non-protection state responsive to a reset signal;
prohibiting access to information stored in a storage of an information processing system when the information processing system is in the protection state;
permitting access to the information when the information processing system is in the non-protection state; and
generating the reset signal responsive to at least one of inputting a password and unlocking a key of the information processing system when the information protection system is in the protection state, thereby causing the releasing operation to release the information processing system from the protection state to the non-protection state.

37. An information protection method as claimed in claim 36, wherein the predetermined setting event comprises at least one of actuation of a switching means, disconnection at a power connection point, disconnection at an information connection point, and removal of an access authorization device from connection with the information processing system.

38. A portable computer comprising:
a storage storing information;
a processor performing processing and accessing the information;
a cover moveable between an open position and a closed position for physically protecting at least a display;
a switch actuated by moving the cover into the closed position; protection means for setting the portable computer into a protection state when the switch is actuated; and
a control means for switching the portable computer from the protection state into a non-protection state responsive to at least one of inputting a password and inserting an ID card when the portable computer is in the protection state.

39. A computer, comprising:
a display moveable between an open position and closed position;
a detector detecting that the display is moved into the closed position; and
a controller setting the computer into a non-accessible to informatin state responsive to an output of the detector and switching the computer from the non-accessible to information state ito an accessible to information state responsive to identifying a user as an authorized person.

40. A computer comprising:
a cover moveable between an open position and a closed position for physically protecting at least an operation panel of the computer in the closed position;
a detector detecting that the cover is moved in the closed position; and
a controller setting the computer into a non-accessible to information state responsive to an output of the detector and switching the computer from the non-accessible to information state into an accessible to information state responsive to identifying a user as an authorized person.

41. A computer comprising:

a storage storing information;

a processor performing processing and accessing the information;

a cover moveable between an open position and a closed position for physically proteting at least a display;

a switch actuated by moving the cover into the closed position;

protection means for setting the computer into a protection state when the switch is actuated; and control means for switching the computer from the protection state into a non-protection state responsive to identifying a user as an authorized person when the computer is in the protection state.

* * * * *

UNITED STATES PATENT AND TRADEMARK OFFICE
CERTIFICATE OF CORRECTION

PATENT NO.    : 6,167,519
DATED         : December 26, 2000
INVENTOR(S)   : Masayuki Sonobe It is certified that error appears in the above-identified patent and that said Letters Patent is hereby corrected as shown below:

<u>Column 18,</u>
Line 39, begin new paragraph with "protection".

Signed and Sealed this

Twenty-sixth Day of March, 2002

Attest:

JAMES E. ROGAN
Attesting Officer            Director of the United States Patent and Trademark Office